United States Patent
Kwon et al.

(10) Patent No.: US 11,455,992 B2
(45) Date of Patent: Sep. 27, 2022

(54) ELECTRONIC DEVICE AND SYSTEM FOR PROCESSING USER INPUT AND METHOD THEREOF

(71) Applicant: Samsung Electronics Co., Ltd., Suwon-si (KR)

(72) Inventors: Sunbeom Kwon, Suwon-si (KR); Sunok Kim, Suwon-si (KR); Hyelim Woo, Suwon-si (KR); Jeehun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 16/795,489

(22) Filed: Feb. 19, 2020

(65) Prior Publication Data

US 2020/0265840 A1      Aug. 20, 2020

(30) Foreign Application Priority Data

Feb. 19, 2019   (KR) .......................... 10-2019-0019306

(51) Int. Cl.
*G10L 15/08*     (2006.01)
*G10L 15/22*     (2006.01)
(Continued)

(52) U.S. Cl.
CPC .............. *G10L 15/22* (2013.01); *G10L 15/02* (2013.01); *G10L 15/18* (2013.01); *G10L 2015/223* (2013.01)

(58) Field of Classification Search
USPC ................ 382/100, 155–160, 209, 224–231; 704/1–10, 200–274
See application file for complete search history.

(56) References Cited

U.S. PATENT DOCUMENTS

| 7,917,368 B2 | 3/2011 | Weinberg et al. |
| 9,076,451 B2 | 7/2015 | Namba et al. |

(Continued)

FOREIGN PATENT DOCUMENTS

| JP | 2005-285138 A | 10/2005 |
| JP | 2011-221344 A | 11/2011 |

(Continued)

OTHER PUBLICATIONS

Notification of Transmittal of the International Search Report and the Written Opinion of the International Searching Authority, or the Declaration dated Jun. 10, 2020 in connection with International Patent Application No. PCT/KR2020/002322, 10 pages.

*Primary Examiner* — Marcellus J Augustin

(57) ABSTRACT

According to an embodiment, an electronic device includes a user interface, a memory, and a processor. The memory is configured to store a main database including at least one input data or an auxiliary database including at least one category including pieces of response data. The processor is configured to receive a user input, using the user interface, and extract first information from the user input. The processor is also configured to identify whether a portion of the input data of the main database matches the first information. The processor is further configured to identify a category of the user input in response to identifying that the input data of the main database does not match the first information. Additionally, the processor is configured to identify the auxiliary database corresponding to the category, and provide first response data based on an event that the auxiliary database is identified.

18 Claims, 13 Drawing Sheets

(51) Int. Cl.
    *G10L 15/02*     (2006.01)
    *G10L 15/18*     (2013.01)

(56) References Cited

U.S. PATENT DOCUMENTS

| | | |
|---|---|---|
| 9,318,108 B2 | 4/2016 | Gruber et al. |
| 2002/0156776 A1* | 10/2002 | Davallou ................ G06F 16/30 |
| 2009/0216538 A1 | 8/2009 | Weinberg et al. |
| 2011/0093272 A1* | 4/2011 | Isobe ...................... G10L 13/10 |
| | | 704/258 |
| 2012/0016678 A1 | 1/2012 | Gruber et al. |
| 2013/0103405 A1 | 4/2013 | Namba et al. |
| 2014/0272821 A1 | 9/2014 | Pitschel et al. |
| 2018/0131802 A1 | 5/2018 | Cho et al. |
| 2018/0143802 A1 | 5/2018 | Jang |
| 2019/0156222 A1* | 5/2019 | Emma ................. G06F 16/3329 |
| 2020/0042649 A1* | 2/2020 | Bakis .................... G06N 20/00 |

FOREIGN PATENT DOCUMENTS

| | | |
|---|---|---|
| KR | 10-2015-0114973 A | 10/2015 |
| KR | 10-2016-0127614 A | 11/2016 |
| KR | 10-2018-0050771 A | 5/2018 |
| KR | 10-2018-0103273 A | 9/2018 |

* cited by examiner

| | |
|---|---|
| U1 | WHAT AM I DOING TOMORROW? |
| A1 | PLEASE MAKE BUCKET LIST YOU WANT AT THIS CHANCE |
| U2 | ALREADY DONE |
| A2 | PLEASE TELL ME IF YOU NEED ANYTHING MORE |

| | | |
|---|---|---|
| DS1 | I DID, I HAVE DONE, I WENT LIKE THAT, I MADE, ⋯ | FIRST CATEGORY |
| DS2 | MOM, MOTHER, DAD, FATHER, WIFE, HUSBAND, ⋯ | SECOND CATEGORY |
| | ⋮ | ⋮ |

| U3 | I DISLIKE MOM |
|---|---|
| A3 | CLOSER RELATIONSHIPS REQUIRE MORE DIALOGUE AND UNDERSTANDING. I HOPE THAT EACH OTHER'S SINCERITY IS DELIVERED |

FIG.9A

ELECTRONIC DEVICE AND SYSTEM FOR PROCESSING USER INPUT AND METHOD THEREOF

CROSS-REFERENCE TO RELATED APPLICATION

This application is based on and claims priority under 35 U.S.C. § 119 to Korean Patent Application No. 10-2019-0019306, filed on Feb. 19, 2019, in the Korean Intellectual Property Office, the disclosure of which is incorporated by reference herein its entirety.

BACKGROUND

1. Field

The disclosure relates to a technology of processing a user input, in particular, a user utterance.

2. Description of Related Art

In addition to a conventional input method using a keyboard or a mouse, electronic devices have recently supported various input schemes such as a voice input and the like. For example, the electronic devices such as smart phones or tablet PCs may receive a user voice and then may provide a service that performs an operation corresponding to the entered user voice.

The speech recognition service is being developed based on a technology for processing a natural language. The technology for processing a natural language refers to a technology that grasps the intent of a user input (utterance) and generates the result matched with the intent to provide the user with the service.

In the meantime, while the chatting mode using the user utterance is executed, it may be difficult for the electronic device to provide appropriate responses to all user inputs. In particular, when a user input that is difficult for the electronic device to recognize is entered, the electronic device has no choice but to provide an ambiguous response.

The above information is presented as background information only to assist with an understanding of the disclosure. No determination has been made, and no assertion is made, as to whether any of the above might be applicable as prior art with regard to the disclosure.

SUMMARY

When the electronic device receives an ambiguous user input while executing a chatting mode using user utterance, the electronic device may provide a user with a response for terminating the conversation not associated with the user input. This makes it difficult for the electronic device and the user to talk to each other continuously.

Furthermore, when purposeless utterance is entered as a user input, the electronic device may not accurately grasp the intent of the user input and may provide the user with a response not corresponding to the user input.

Aspects of the disclosure are to address at least the above-mentioned problems and/or disadvantages and to provide at least the advantages described below. Accordingly, an aspect of the disclosure is to provide an electronic device and a system that are capable of providing the user with an appropriate response even though ambiguous or purposeless utterance is entered, by providing the user with response data from the database classified based on a category.

In accordance with an aspect of the disclosure, an electronic device may include a user interface, a processor operatively coupled to the user interface, and a memory operatively coupled to the processor. The memory may be configured to store a main database including at least one input data and/or an auxiliary database including at least one category including pieces of response data. The memory may store instructions that, when executed, cause the processor to receive a user input, using the user interface, to extract first information from the user input, to identify the input data of the main database matched with the first information, to identify a category of the user input based on an event that the input data of the main database matched with the first information is not identified, to identify the auxiliary database corresponding to the category, and to provide first response data based on an event that the auxiliary database is identified.

In accordance with another aspect of the disclosure, a method may include receiving the user input, using a user interface, extracting first information from the user input, identifying input data of a main database matched with the first information, identifying a category of the user input based on an event that the input data of the main database matched with the first information is not identified, identifying an auxiliary database corresponding to the category, and providing first response databased on an event that the auxiliary database is identified.

In accordance with another aspect of the disclosure, a system may include a first electronic device including a communication module and a user interface and a second electronic device communicating with the first electronic device through the communication module and including a processor and a memory operatively coupled to the processor. The memory may be configured to store a main database including at least one input data and/or an auxiliary database including at least one category including pieces of response data. The memory may store instructions that, when executed, cause the processor to receive a user input entered to the first electronic device using the user interface, from the first electronic device, to extract first information from the user input, to identify the input data of the main database matched with the first information, to identify a category of the user input based on an event that the input data of the main database matched with the first information is not identified, to identify the auxiliary database corresponding to the category, and to transmit first response data to the first electronic device based on an event that the auxiliary database is identified.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A illustrates a view for describing a user input and response data, according to an embodiment disclosed in the specification;

FIG. 8B illustrates a view for describing a user input and a category, according to an embodiment disclosed in the specification;

FIG. 9A illustrates a view for describing a user input and response data, according to an embodiment disclosed in the specification;

DETAILED DESCRIPTION

FIGS. 1 through 9C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
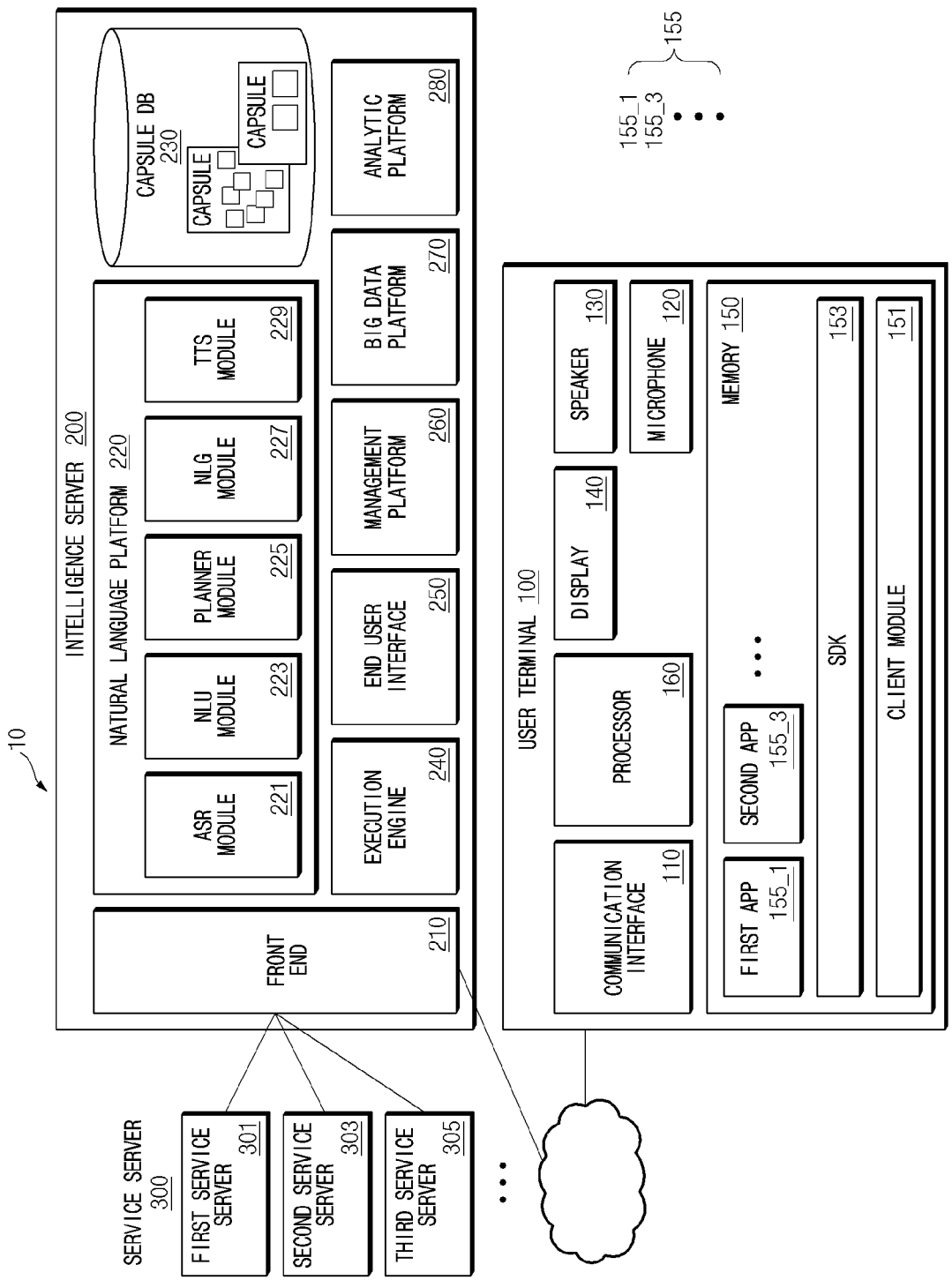
FIG. 1 illustrates a block diagram of an integrated intelligence system, according to an embodiment.

FIG. 1 illustrates a block diagram of an integrated intelligence system, according to an embodiment.

Referring to FIG. 1, an integrated intelligence system 10 according to an embodiment may include a user terminal 100, an intelligence server 200, and a service server 300.

The user terminal 100 according to an embodiment may be a terminal device (or an electronic apparatus) capable of connecting to Internet, and may be, for example, a mobile phone, a smartphone, a personal digital assistant (PDA), a notebook computer, TV, a white household appliance, a wearable device, a head mount display (HMD), or a smart speaker.

According to the illustrated embodiment, the user terminal 100 may include a communication interface 110, a microphone 120, a speaker 130, a display 140, a memory 150, or a processor 160. The listed components may be operatively or electrically connected to one another.

According to an embodiment, the communication interface 110 may be configured to transmit or receive data to or from an external device. According to an embodiment, the microphone 120 may receive a sound (e.g., a user utterance) to convert the sound into an electrical signal. According to an embodiment, the speaker 130 may output the electrical signal as a sound (e.g., voice). According to an embodiment, the display 140 may be configured to display an image or a video. According to an embodiment, the display 140 may display the graphic user interface (GUI) of the running app (or an application program).

According to an embodiment, the memory 150 may store a client module 151, a software development kit (SDK) 153, and a plurality of apps 155. The client module 151 and the SDK 153 may constitute a framework (or a solution program) for performing general-purposed functions. Furthermore, the client module 151 or the SDK 153 may constitute the framework for processing a voice input.

According to an embodiment, the plurality of apps 155 in the memory 150 may be a program for performing the specified function. According to an embodiment, the plurality of apps 155 may include a first app 155_1 and a second app 155_3. According to an embodiment, each of the plurality of apps 155 may include a plurality of actions for performing the specified function. For example, the apps may include an alarm app, a message app, and/or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, and the display 140 to perform a specified action.

According to an embodiment, the processor 160 may also execute the program stored in the memory 150 to perform the specified function. For example, the processor 160 may execute at least one of the client module 151 or the SDK 153 to perform the following actions for processing a voice input. The processor 160 may control the actions of the plurality of apps 155 via the SDK 153. The following actions described as the actions of the client module 151 or the SDK 153 may be the action by the execution of the processor 160.

According to an embodiment, the client module 151 may receive a voice input. For example, the client module 151 may receive a voice signal corresponding to a user utterance detected via the microphone 120. The client module 151 may transmit the received voice input to the intelligence server 200. The client module 151 may transmit the state information of the user terminal 100 together with the received voice input, to the intelligence server 200. For example, the state information may be the execution state information of an app.

According to an embodiment, the client module 151 may receive the result corresponding to the received voice input. For example, when calculating the result corresponding to the received voice input from the intelligence server 200, the client module 151 may receive the result corresponding to the received voice input from the intelligence server 200. The client module 151 may display the received result in the display 140.

According to an embodiment, the client module 151 may receive the plan corresponding to the received voice input. The client module 151 may display the result of executing a plurality of actions of an app in the display 140 depending on the plan. For example, the client module 151 may sequentially display the execution result of a plurality of actions in a display. For another example, the user terminal 100 may display only a part of results (e.g., the result of the last action) of executing a plurality of actions, on the display.

According to an embodiment, the client module 151 may receive a request for obtaining information necessary to calculate the result corresponding to a voice input, from the intelligence server 200. According to an embodiment, the client module 151 may transmit the necessary information to the intelligence server 200 in response to the request.

According to an embodiment, the client module 151 may transmit information about the result of executing a plurality of actions depending on the plan, to the intelligence server 200. The intelligence server 200 may determine that the received voice input is processed correctly, using the result information.

According to an embodiment, the client module 151 may include a voice recognition module. According to an embodiment, the client module 151 may recognize a voice input to perform the limited function, via the voice recognition module. For example, the client module 151 may launch an intelligence app that processes a voice input for performing an organic action, via a specified input (e.g., wake up!).

According to an embodiment, the intelligence server 200 may receive the information associated with a user's voice input from the user terminal 100 over a communication network. According to an embodiment, the intelligence server 200 may change the data associated with the received voice input to text data. According to an embodiment, the intelligence server 200 may generate a plan for performing a task corresponding to a user voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligence server 200 may transmit the result according to the generated plan to the user terminal 100 or may transmit the generated plan to the user terminal 100. According to an embodiment, the user terminal 100 may display the result according to the plan, on a display. According to an embodiment, the user terminal 100 may display the result of executing the action according to the plan, on the display.

The intelligence server 200 according to an embodiment may include a front end 210, a natural language platform 220, a capsule DB 230, an execution engine 240, an end user interface 250, a management platform 260, a big data platform 270, or an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech module (TTS) module 229.

According to an embodiment, the ASR module 221 may convert the voice input received from the user terminal 100 to text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to an intent.

According to an embodiment, the planner module 225 may generate the plan by using the intent and a parameter, which are determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or the result value output by the execution of the plurality of actions. The parameter and the result value may be defined as a concept of the specified form (or class). As such, the plan may include the plurality of actions and a plurality of concepts determined by the intent of the user. The planner module 225 may determine the relationship between the plurality of actions and the plurality of concepts stepwise (or hierarchically). For example, the planner module 225 may determine the execution sequence of the plurality of actions, which are determined based on a user's intent, based on the plurality of concepts. In other words, the planner module 225 may determine the execution sequence of the plurality of actions, based on the parameters necessary to perform the plurality of actions and the result output by the execution of the plurality of actions. As such, the planner module 225 may generate a plan including information (e.g., ontology) of the relationship between a plurality of actions and a plurality of concepts. The planner module 225 may generate the plan, using the information stored in the capsule DB 230 storing a set of relationships between concepts and actions.

According to an embodiment, the NLG module 227 may change the specified information into information in the text form. The information changed to the text form may be a form of a natural language utterance. The TTS module 229 according to an embodiment may change information of the text form to information of a voice form.

According to an embodiment, all or part of functions of the natural language platform 220 may be implemented in the user terminal 100.

The capsule DB 230 may store information about the relationship between the actions and the plurality of concepts corresponding to a plurality of domains. The capsule according to an embodiment may include a plurality of action objects (or action information) and concept objects (or concept information) included in the plan. According to an embodiment, the capsule DB 230 may store the plurality of capsules in the form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. The strategy information may include reference information for determining a single plan when there are a plurality of plans corresponding to the voice input. According to an embodiment, the capsule DB 230 may include a follow up registry that stores the information of the follow-up action for suggesting a follow-up action to the user in the specified context. For example, the follow-up action may include a follow-up utterance. According to an embodiment, the capsule DB 230 may include a layout registry for storing layout information of the information output via the user terminal 100. According to an embodiment, the capsule DB 230 may include a vocabulary registry that stores vocabulary information included in the capsule information. According to an embodiment, the capsule DB 230 may include a dialog registry that stores information about dialog (or interaction) with the user. The capsule DB 230 may update the stored object via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow up editor capable of activating the follow-up target and editing the follow-up utterance for providing a hint. The follow-up target may be determined based on the currently set target, the preference of the user, or environment condition. In an embodiment, the capsule DB 230 may be implemented in the user terminal 100.

According to an embodiment, the execution engine 240 may calculate the result, using the generated plan. According to an embodiment, the end user interface 250 may transmit the calculated result to the user terminal 100. As such, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage the quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., food order or hotel reservation). The service server 300 can include a first service server 301, a second service server 303, a third service server 305, additional service servers, or any combination thereof. According to an embodiment, the service server 300 may be a server operated by the third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system 10, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize the user utterance or the voice input received via the microphone and may provide the user with a service corresponding to the recognized voice input.

According to an embodiment, the user terminal 100 may perform a specified action, based on the received voice input, exclusively, or together with the intelligence server and/or the service server. For example, the user terminal 100 may execute an app corresponding to the received voice input and may perform the specified action via the executed app.

According to an embodiment, when the user terminal 100 provides a service together with the intelligence server 200 and/or the service server, the user terminal may detect a user utterance, using the microphone 120 and may generate a signal (or voice data) corresponding to the detected user utterance. The user terminal may transmit the voice data to the intelligence server 200, using the communication interface 110.

According to an embodiment, the intelligence server 200 may generate a plan for performing a task corresponding to the voice input or the result of performing an action depending on the plan, as the response to the voice input received from the user terminal 100. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 100 may receive the response, using the communication interface 110. The user terminal 100 may output the voice signal generated in user terminal 100, to the outside using the speaker 130 or may output an image generated in the user terminal 100, to the outside using the display 140.

Figure 2:
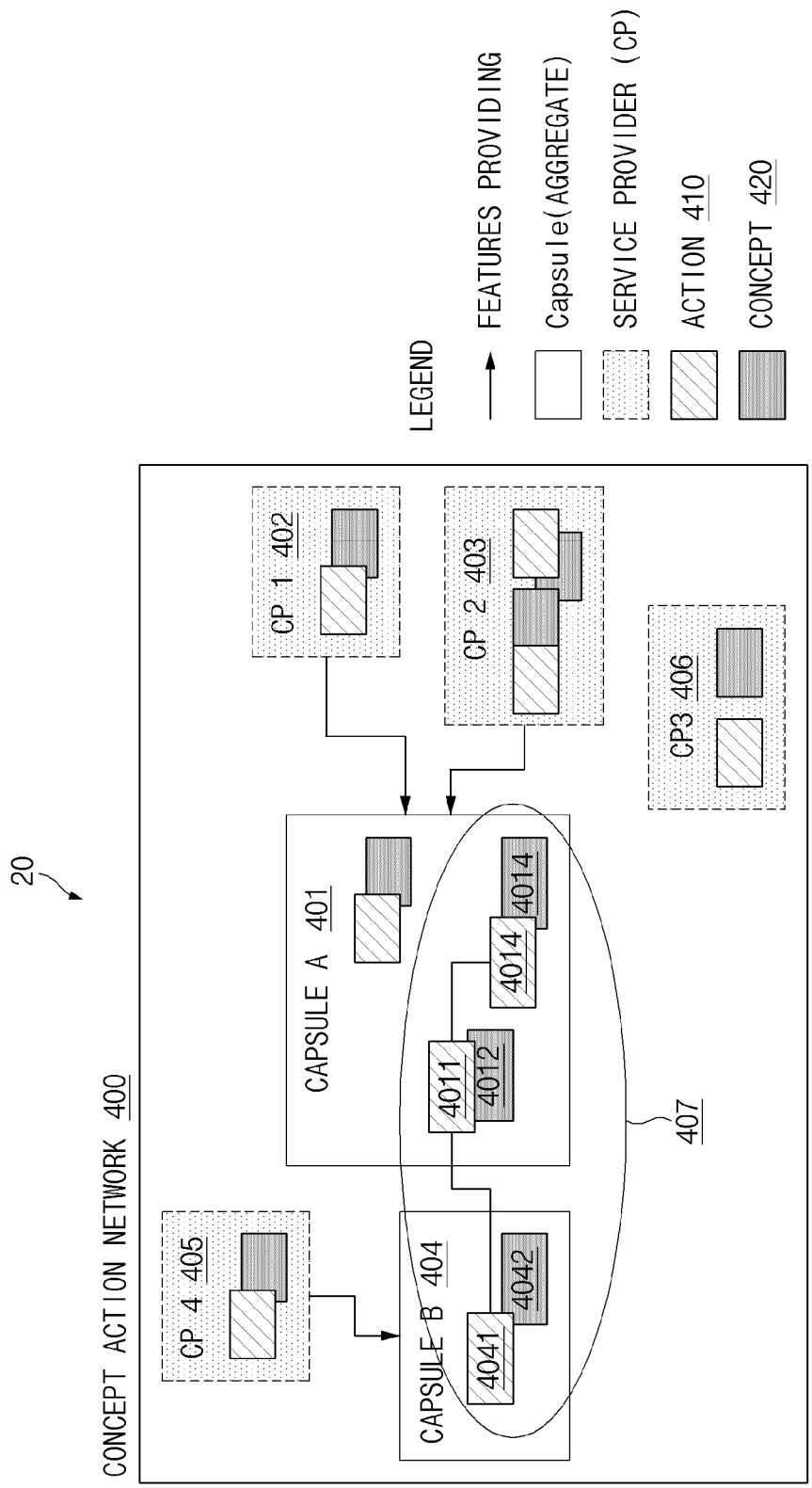
FIG. 2 illustrates a diagram of the form in which relationship information between a concept and an action is stored in a database, according to an embodiment.

FIG. 2 illustrates a diagram of the form 20 in which relationship information between a concept and an action is stored in a database, according to various embodiments.

The capsule database (e.g., the capsule DB 230) of the intelligence server 200 may store a capsule in the form of a concept action network (CAN) 400. The capsule database may store an action for processing a task corresponding to a voice input and a parameter necessary for the action, in the CAN form.

The capsule database may store a plurality of capsules (e.g., capsule A 401 and capsule B 404) respectively corresponding to a plurality of domains (e.g., applications). According to an embodiment, a single capsule (e.g., the capsule A 401) may correspond to one domain (e.g., geo or application). Furthermore, the single capsule may correspond to at least one service provider (e.g., CP 1 402 or CP 2 403) for performing the function of the domain associated with the capsule. According to an embodiment, the single capsule may include at least one or more actions 410 and at least one or more concepts 420 for performing a specified function.

The natural language platform 220 may generate a plan for performing a task corresponding to the received voice input, using the capsule stored in the capsule database. For example, the planner module 225 of the natural language platform may generate a plan, using the capsule stored in the capsule database. For example, a plan 407 may be generated using actions 4011 and 4013 and concepts 4012 and 4014 of the capsule A 401 and an action 4041 and a concept 4042 of the capsule B 404.

Figure 3:
FIG. 3 illustrates a view of a user terminal displaying a screen of processing a voice input received through an intelligence app, according to an embodiment.

FIG. 3 illustrates a view of a screen in which a user terminal 100 processing a received voice input through an intelligence app, according to various embodiments.

The user terminal 100 may execute an intelligence app to process a user input through the intelligence server 200.

According to an embodiment, in screen 310, when recognizing a specified voice input (e.g., wake up!) or receiving an input via a hardware key (e.g., the dedicated hardware key), the user terminal 100 may launch an intelligence app for processing a voice input. For example, the user terminal 100 may launch an intelligence app in a state in which a schedule app is being executed. According to an embodiment, the user terminal 100 may display an object (e.g., an icon) 311 corresponding to the intelligence app, in the display 140. According to an embodiment, the user terminal 100 may receive a voice input by a user utterance. For example, the user terminal 100 may receive a voice input saying that "Let me know the schedule of this week!". According to an embodiment, the user terminal 100 may display a user interface (UI) 313 (e.g., an input window) of an intelligence app, in which text data of the received voice input is displayed, in a display According to an embodiment, in screen 320, the user terminal 100 may display the result corresponding to the received voice input, in the display. For example, the user terminal 100 may receive the plan corresponding to the received user input and may display 'the schedule of this week' in the display depending on the plan.

Figure 4:
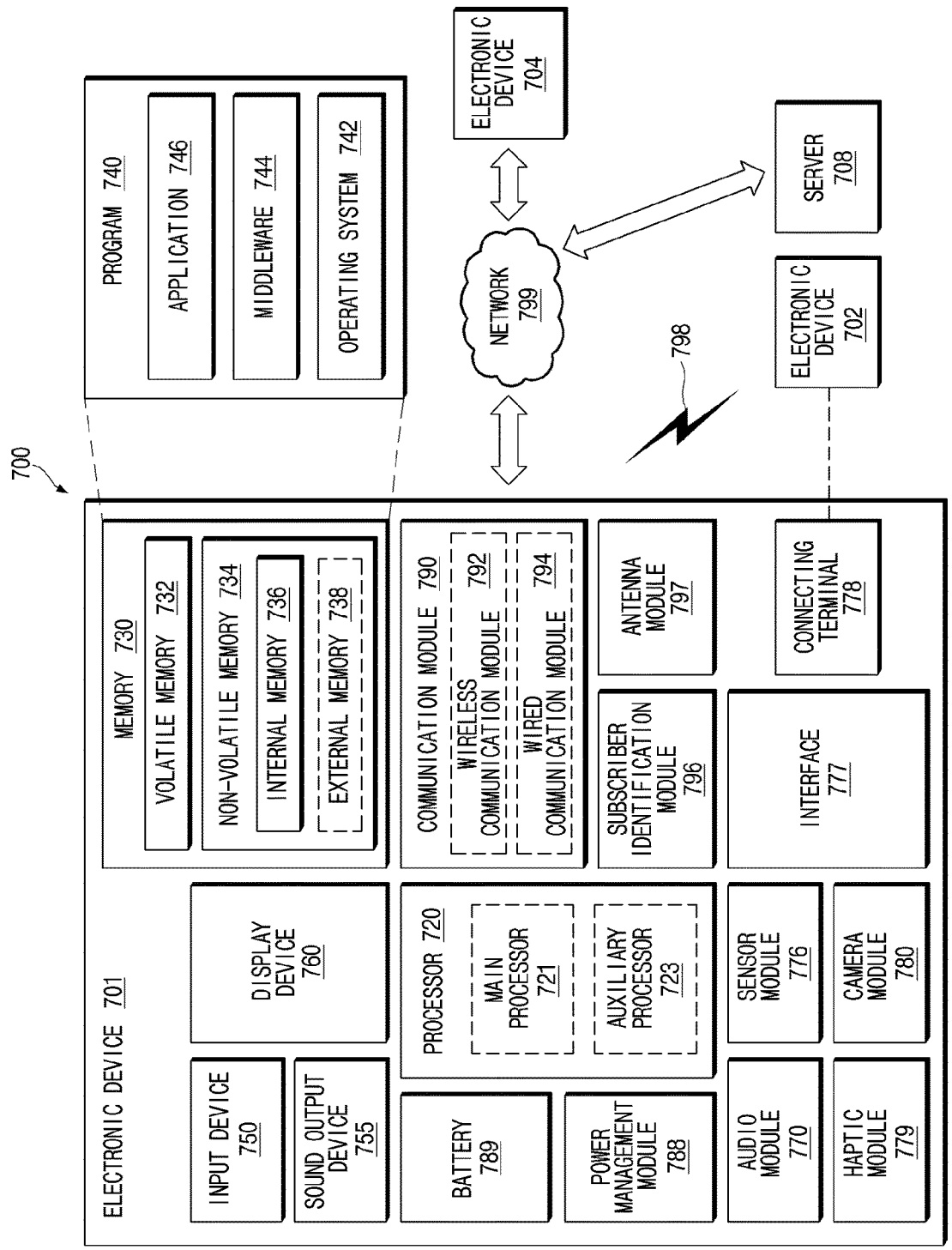
FIG. 4 illustrates a block diagram of an electronic device in a network environment according to an embodiment of the disclosure.

FIG. 4 illustrates a block diagram illustrating an electronic device 701 in a network environment 700 according to various embodiments. Referring to FIG. 4, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as BLUETOOTH, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

The user terminal 100 of FIGS. 1, 2, and 3 may correspond to the electronic device 701. In an embodiment, the intelligence server 200 of FIG. 1 may correspond to one of the electronic device 704 and the server 708. In an embodiment, the processor 160 of FIG. 1 may correspond to the processor 720; the display 140 of FIG. 1 may correspond to the display device 760; the speaker 130 of FIG. 1 may correspond to the sound output device 755.

Hereinafter, the intelligence system 50 including an electronic device according to an embodiment disclosed in the specification will be described with reference to FIG. 5.

Figure 5:
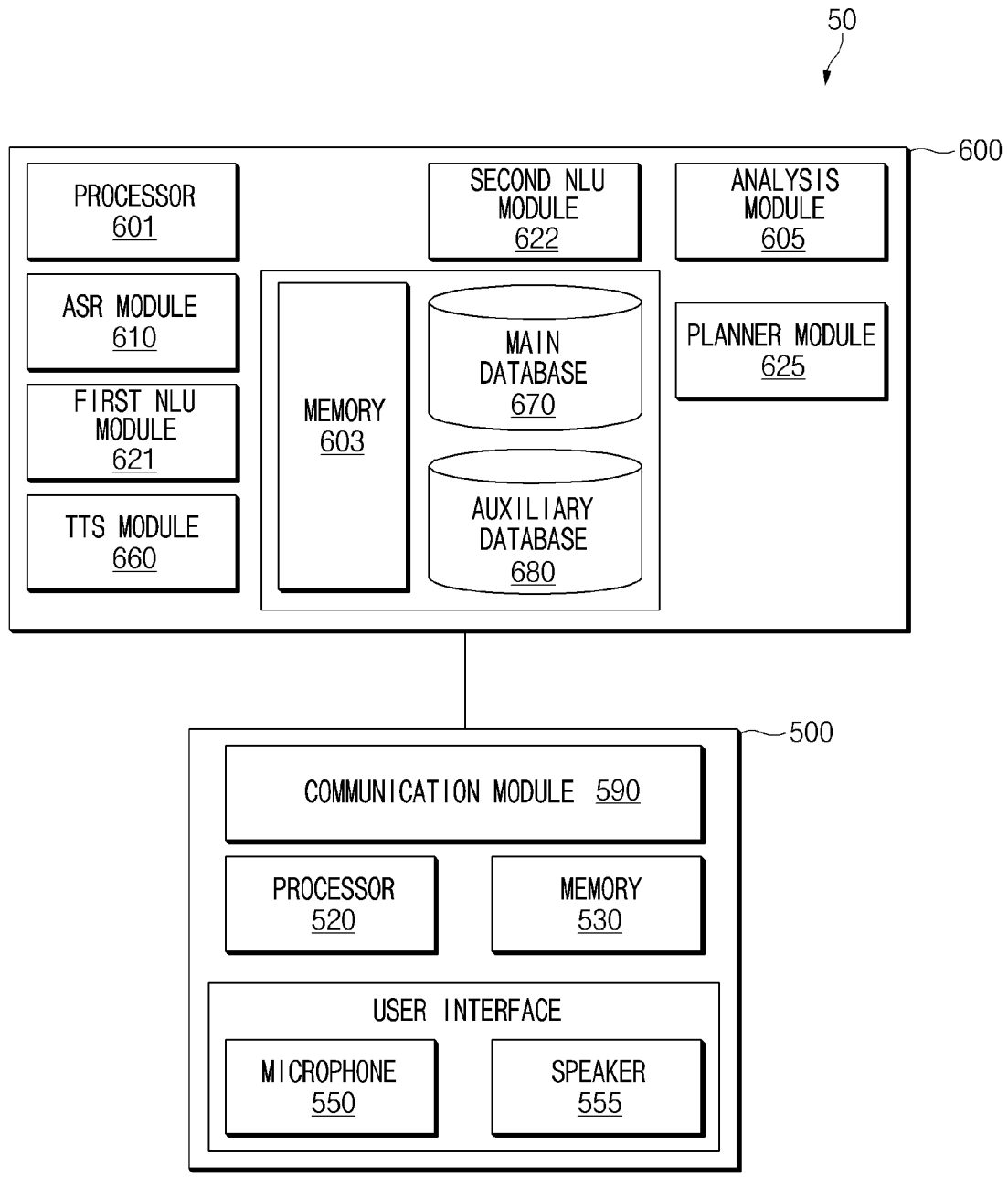
FIG. 5 illustrates a view for describing an intelligence system according to an embodiment disclosed in the specification.

FIG. 5 illustrates a view for describing the intelligence system 50 according to an embodiment disclosed in the specification. For clarity of descriptions, contents the same as the above-described details are briefly described or omitted.

Referring to FIG. 5, the intelligence system 50 may include a first electronic device 500 (e.g., the user terminal 100 of FIG. 1) and a second electronic device 600 (e.g., the intelligence server 200 of FIG. 1).

The first electronic device 500 may include a processor 520 (e.g., the processor 160 of FIG. 1 and/or the processor 720 of FIG. 4), a memory 530 (e.g., the memory 730 of FIG. 4), a user interface, and a communication module 590 (e.g., the communication module 790 of FIG. 4). The user interface may include a microphone 550 (e.g., the microphone 120 of FIG. 1 and/or the input device 750 of FIG. 4) and a speaker 555 (e.g., the speaker 130 of FIG. 1 and/or the sound output device 755 of FIG. 4).

The first electronic device 500 may further include at least one of additional components in addition to the components illustrated in FIG. 5. According to an embodiment, the components of the first electronic device 500 may be the same entities or may constitute separate entities.

For example, the first electronic device 500 may include a smartphone, a tablet PC, a wearable device, a home appliance, or a digital camera.

According to an embodiment, the processor 520 may be operatively coupled to the communication module 590, the memory 530, and the user interface (the microphone 550 and the speaker 555) to perform overall functions of the first electronic device 500. For example, the processor 520 may include one or more processors. For example, one or more processors may include an image signal processor (ISP), an application processor (AP), or a communication processor (CP).

Modules described in various embodiments of the disclosure may be implemented by hardware or software.

The first electronic device 500 may receive a user input by using a user interface.

In an embodiment, the user input may be a user's voice input (e.g., utterance). When the user input is a voice input, the first electronic device 500 may receive a user input through the microphone 550.

In an embodiment, the user input may be the user's text input. When the user input is a text input, the first electronic device 500 may receive a user input through an input device (e.g., the input device 750 of FIG. 4).

The processor 520 may be configured to transmit a user input to the second electronic device 600, using the communication module 590. When receiving response data corresponding to the user input from the second electronic device 600 through the communication module 590, the processor 520 may allow the response data to be output through a speaker 555.

The memory 530 may store a main database 670 including at least one input data and/or an auxiliary database 680 including at least one category including pieces of response data. The memory 530 may store commands, information, or data associated with operations of components included in the first electronic device 500. For example, the memory 530 may store instructions, when executed, that cause the processor 520 to perform various operations described in the disclosure.

The second electronic device 600 may include a processor 601, an ASR module 610 (e.g., the ASR module 221 of FIG. 1), a first NLU module 621 (e.g., the NLU module 223 of FIG. 1), a second NLU module 622, a TTS module 660 (e.g., the TTS module 229 of FIG. 1), a memory 603, the main database 670, the auxiliary database 680, a planner module 625 (e.g., the planner module 225 of FIG. 1), and an analysis module 605.

The second electronic device 600 may further include at least one of additional components in addition to the components illustrated in FIG. 5. For example, the second electronic device 600 may include a communication module or a connecting terminal for communicating with the first electronic device 500. According to an embodiment, the components of the second electronic device 600 may be the same entities or may constitute separate entities.

The processor 601 may drive the ASR module 610, the first NLU module 621, the second NLU module 622, the analysis module 605, the planner module 625, and the TTS module 660 by executing the instructions stored in the memory 603. The processor 601 may be operatively coupled to the ASR module 610, the first NLU module 621, the second NLU module 622, the analysis module 605, the planner module 625, and the TTS module 660 to perform overall functions of the second electronic device 600. In the embodiment disclosed in this specification, it may be understood that the operation performed (or executed) by the ASR module 610, the first NLU module 621, the second NLU module 622, the analysis module 605, the planner module 625, and the TTS module 660 is an operation performed by the processor 601 executing instructions stored in the memory 603.

The memory 603 may store commands, information, or data associated with operations of components included in the second electronic device 600. For example, the memory 603 may store instructions, when executed, that cause the processor 601 to perform various operations described in the present disclosure.

In an embodiment, unlike the illustration of FIG. 5, the processor 601 may include the ASR module 610, the first NLU module 621, the second NLU module 622, the analysis module 605, the planner module 625, and the TTS module 660. In this case, the operation performed (or executed) by each of the ASR module 610, the first NLU module 621, the second NLU module 622, the analysis module 605, the planner module 625, and the TTS module 660 may be implemented as at least part of the processor 601.

In an embodiment, the second NLU module 622 may include the analysis module 605. The operation performed (or executed) by the analysis module 605 may be implemented as a part of the second NLU module 622.

In an embodiment, the second electronic device 600 may receive a user input from the first electronic device 500. For example, the user input may be a user utterance.

The ASR module 610 may convert the received user input into text data.

The first NLU module 621 may determine user intent by performing grammatical analysis or semantic analysis on the user input. The planner module 625 may generate the plan, using the intent and the parameter, which are determined by the first NLU module 621. According to an embodiment, the planner module 625 may determine one or more domains necessary to perform a task, based on the determined intent. For example, the planner module 625 may grasp that a user desires to execute a capsule or domain (e.g., chat bot) supporting the chatting mode using an utterance, based on a user input.

The second NLU module 622 may extract first information from the user input by perform grammatical analysis or semantic analysis. For example, the first information may include a parameter (or slot) required to represent the user intent, the domain, or the intent, a word included in a user input, and the part of speech corresponding to the word included in the user input. In an embodiment, the second NLU module 622 may be executed in the capsule or domain. For example, the capsule or domain may be a chat domain, a weather domain, a music domain, or a third party domain, but the embodiments disclosed in this specification are not limited thereto.

The second NLU module 622 may identify the input data of the main database 670 matched with the first information, based on the first information. Weight information may be included in the first information based on the event that the second NLU module 622 identifies the input data of the main database 670 matched with the first information. For example, the weight information may indicate the extent to which the first information is matched with the input data of the main database 670.

The main database 670 may include an input data set and a response data set corresponding to the input data. The input data set may include pieces of input data capable of being matched with a user input (e.g., the first information). The response data set may include pieces of response data corresponding to the input data. For example, when the user input is matched with first input data in the input data set of the main database 670, the processor 601 or the second NLU module 622 may output first response data corresponding to the first input data from the main database 670.

The analysis module 605 may identify the category of the user input based on the event that the input data of the main database 670 matched with the first information is not identified. The category may include, for example, affirmative, negative, completion, family, and love categories, but the embodiments disclosed in this specification are not limited thereto.

In an embodiment, the case where the input data of the main database 670 matched with the first information is not identified may be the case where the input data capable of being matched with the first information is present in the main database 670 but the weight is less than a reference weight. For example, when the weight is less than a reference weight, the extent to which the first information is matched with the first input data may be low. In this case, when the first response data corresponding to the first input data is output to a user, the user may recognize that the first electronic device 500 does not give a proper response to the user input.

In an embodiment, the case where the input data of the main database 670 matched with the first information is not identified may be the case where the input data matched with the first information is not included in the input data set of the main database 670. In an embodiment, the case where the input data of the main database 670 matched with the first information is not identified may be the case where the input data matched with the first information is difficult to be specified in the input data set of the main database 670.

When the input data of the main database 670 matched with the first information is not identified, the second NLU module 622 may not output response data in the main database 670 and may deliver the user input to the analysis module 605.

In an embodiment, when the analysis module 605 is implemented in the second NLU module 622, the second NLU module 622 may not output the response data from the main database 670 and may identify the category of the user input.

For example, the analysis module 605 may extract second information from the user input. For example, the second information may include a word included in the user input and information of the part of speech corresponding to the word. For example, the second information may include keyword information, such as, a string included in the user input. For example, unlike the first information, the second information may not include weight information.

The analysis module 605 may identify the category of the user input based on the second information. The analysis module 605 may identify the auxiliary database 680 corresponding to the identified category.

For example, the auxiliary database 680 may include one or more databases including a response data set for each category. For example, the response data set may include pieces of response data. For example, the auxiliary database 680 may include 'n' category DBs ('n' is a natural number). When each category DB is identified as the category corresponding to the user input, each category DB may include a response data set to be provided. For example, the auxiliary database 680 may include a first category DB corresponding to a complete category and a second category DB corresponding to a family category. When the user input is identified as the complete category, the analysis module 605 may identify the first category DB being the auxiliary database 680.

The analysis module 605 may provide response data from the auxiliary database 680, based on the event that the auxiliary database 680 (e.g., the first category DB) is identified. For example, the analysis module 605 may output single response data among pieces of response data included in the auxiliary database 680 (e.g., the first category DB).

In an embodiment, the auxiliary database 680 may include the response data set corresponding to the category not included in the main database 670. For example, when the input data matched with the first information is not included in the input data set of the main database 670, the electronic device according to an embodiment disclosed in the specification may provide the user with the response data in the auxiliary database 680.

In an embodiment, the auxiliary database 680 may include the response data set corresponding to the category included in the main database 670. For example, when the input data matched with the first information is present in the input data set of the main database 670 but the weight is less than the reference weight or it is difficult to specify response data, the electronic device according to an embodiment disclosed in the specification may provide the user with the response data in the auxiliary database 680.

The TTS module 660 may convert the response data being in a text form into voice data. The second electronic device 600 may transmit the response data converted into the voice data, to the first electronic device 500. The first electronic device 500 and/or the processor 520 may output the response data converted into the voice data, through the speaker 555.

In an embodiment, the operations of each component described with reference to the second electronic device 600 may be performed (or executed) by the first electronic device 500.

In an embodiment, the category DB of the auxiliary database 680 may further include a sub category DB. When the phrases associated with emotion is included in the user input, after identifying the category DB, the electronic device may identify the sub category DB based on the phrase associated with the emotion. For example, the second information may include information indicating that the phrase associated with the emotion is included. The electronic device may output the response data corresponding to user input in the sub category DB.

Hereinafter, a method in which an electronic device according to an embodiment disclosed in the specification processes a user input will be described with reference to FIG. 6.

Figure 6:
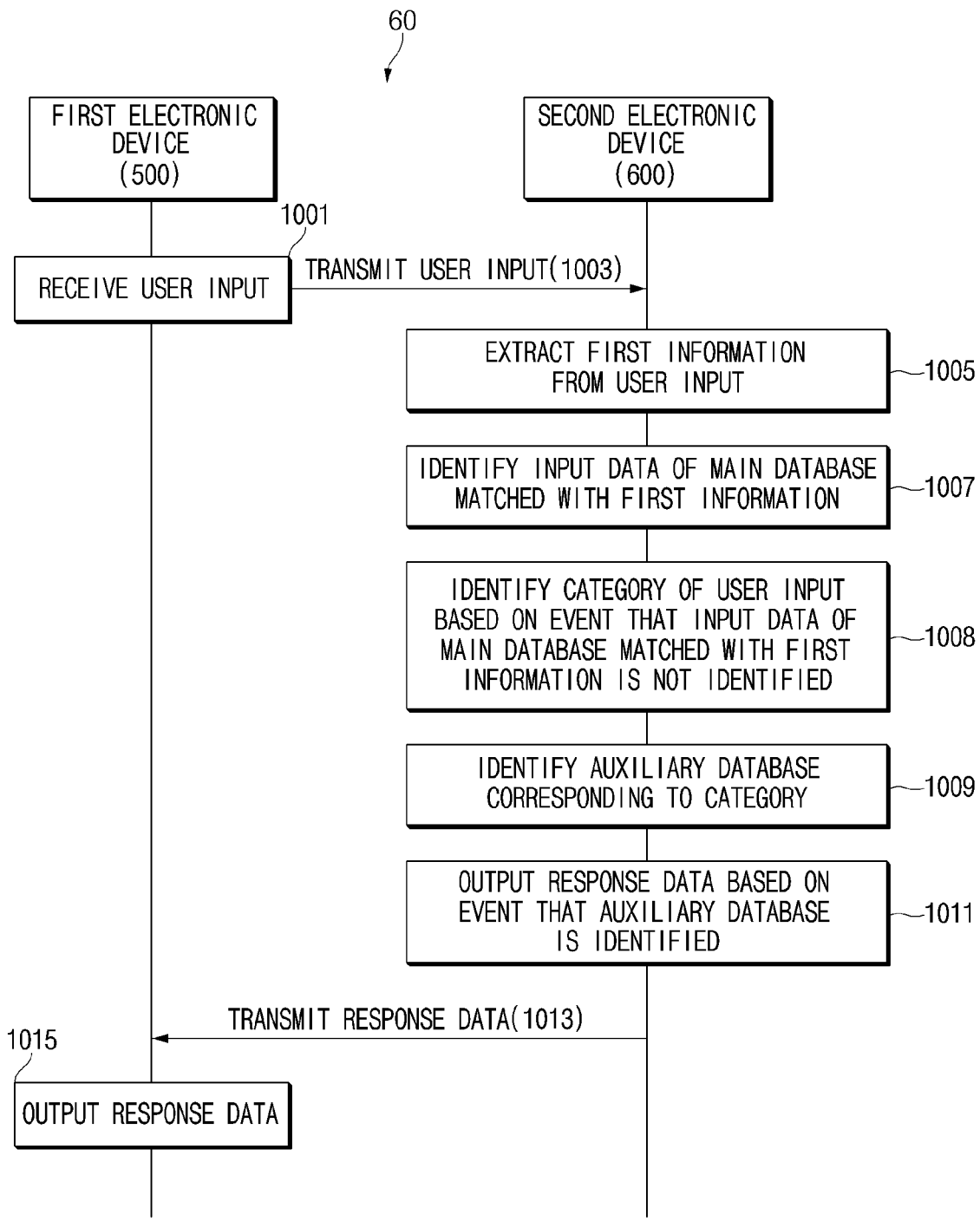
FIG. 6 illustrates a sequence diagram for describing a method of providing response data corresponding to a user input of an electronic device according to an embodiment disclosed in the specification.

FIG. 6 illustrates a sequence diagram 60 for describing a method of providing response data corresponding to a user input of an electronic device according to an embodiment disclosed in the specification. For clarity of descriptions, contents the same as the above-described details are briefly described or omitted.

Hereinafter, it is assumed that the first electronic device 500 and the second electronic device 600 of FIG. 5 perform the process of FIG. 6. The operation described as being performed by the first electronic device 500 and the second electronic device 600 may be implemented using instructions capable of being performed (or executed) by each of the processor 520 of the first electronic device 500 and the processor 601 of the second electronic device 600. For example, the instructions capable of being performed (or executed) by the processor 520 may be stored in a computer-readable recording medium or the memory 530 of the first electronic device 500 illustrated in FIG. 5. For example, the instructions capable of being performed (or executed) by the processor 601 may be stored in a computer-readable recording medium or the memory 603 of the second electronic device 600 illustrated in FIG. 5.

Referring to FIGS. 5 and 6, in operation 1001, the first electronic device 500 may receive a user input. For example, the user input may be a user's voice input. For example, the user may enter a voice, using the microphone 550 of the first electronic device 500.

In operation 1003, the first electronic device 500 may transmit a user input to the second electronic device 600. For example, the first electronic device 500 may transmit the user input, using the communication module 590.

In operation 1005, the second electronic device 600 may extract first information from the user input. For example, the second electronic device 600 may extract the first information from the user input based on natural language processing.

In operation 1007, the second electronic device 600 may identify the input data of the main database 670 matched with the first information. For example, the second electronic device 600 may access the main database 670 to search for the input data matched with the first information.

In operation 1008, the second electronic device 600 may identify the category of the user input based on the event that the input data of the main database 670 matched with the first information is not identified. When the extent to which the first information is matched with the input data is low or when the input data matched with the first information is not present in the main database 670, the second electronic device 600 may not output the response data in the main database 670.

In operation 1009, the second electronic device 600 may identify the auxiliary database 680 corresponding to the identified category. The second electronic device 600 may identify which category DB the user input corresponds to, in the category DB included in the auxiliary database 680. For example, the second electronic device 600 may identify the category DB corresponding to the category of the user input, in 'n' category DBs ('n' is a natural number) included in the auxiliary database 680.

In operation 1011, the second electronic device 600 may output the response data based on the event that the auxiliary database 680 is identified. For example, the identified auxiliary database 680 (i.e., one in the category DB) may include a response data set. The second electronic device 600 may provide the single response data in the response data set included in the identified auxiliary database 680.

In operation 1013, the second electronic device 600 may transmit the response data to the first electronic device 500. The response data output from the auxiliary database 680 may be in a text form. The second electronic device 600 may convert the response data being in the text form into voice data to transmit the voice data to the first electronic device 500.

In operation 1015, the first electronic device 500 may output the response data received from the second electronic device 600. For example, the first electronic device 500 may output the response data received as the voice data, through the speaker 555.

Hereinafter, a method in which an electronic device according to an embodiment disclosed in the specification processes a user input will be described with reference to FIGS. 7, 8A, 8B, and 8C.

Figure 7:
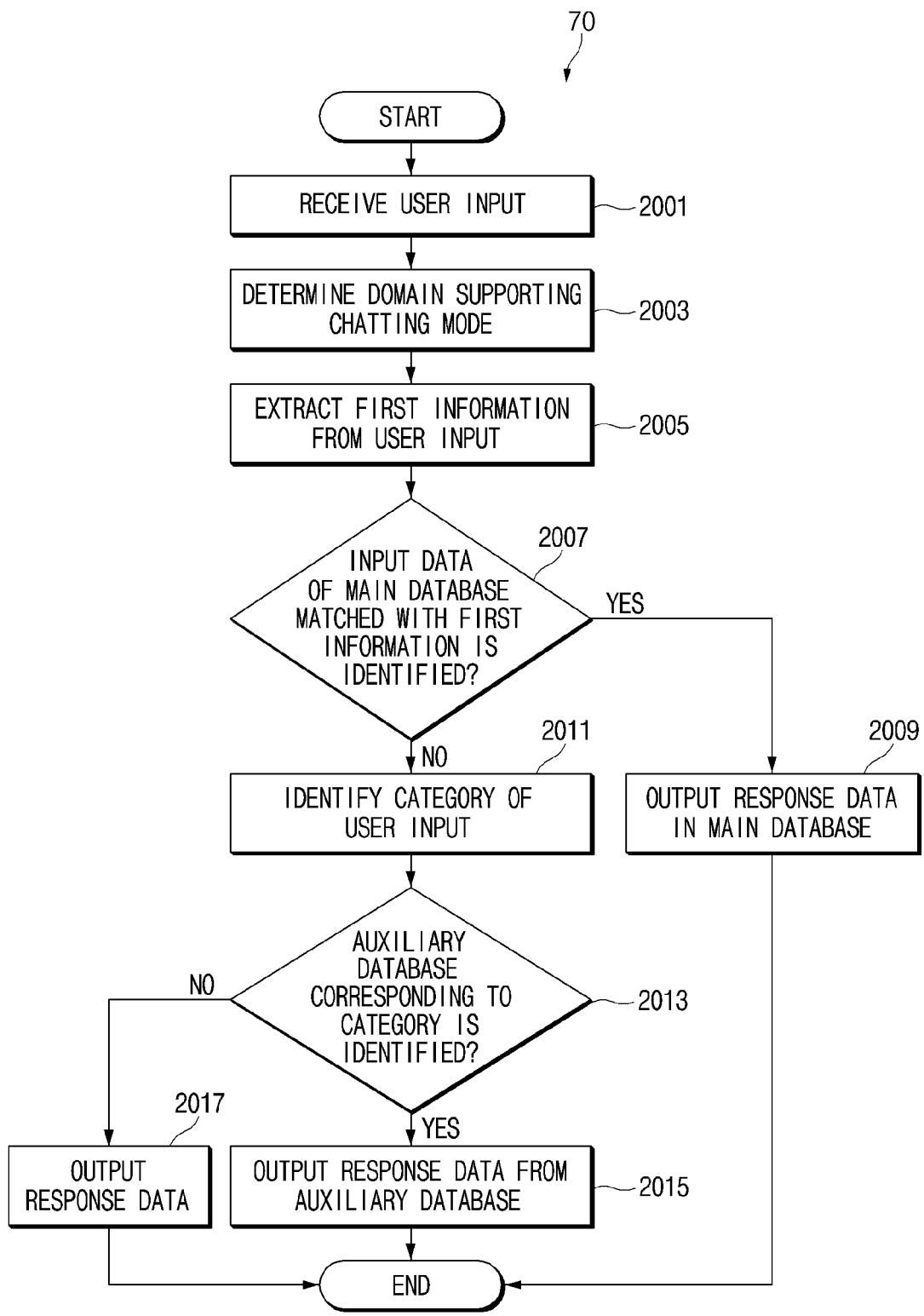
FIG. 7 illustrates a flowchart for describing an operation method in which an electronic device processes a user input, according to an embodiment disclosed in the specification.
Figure 8C:
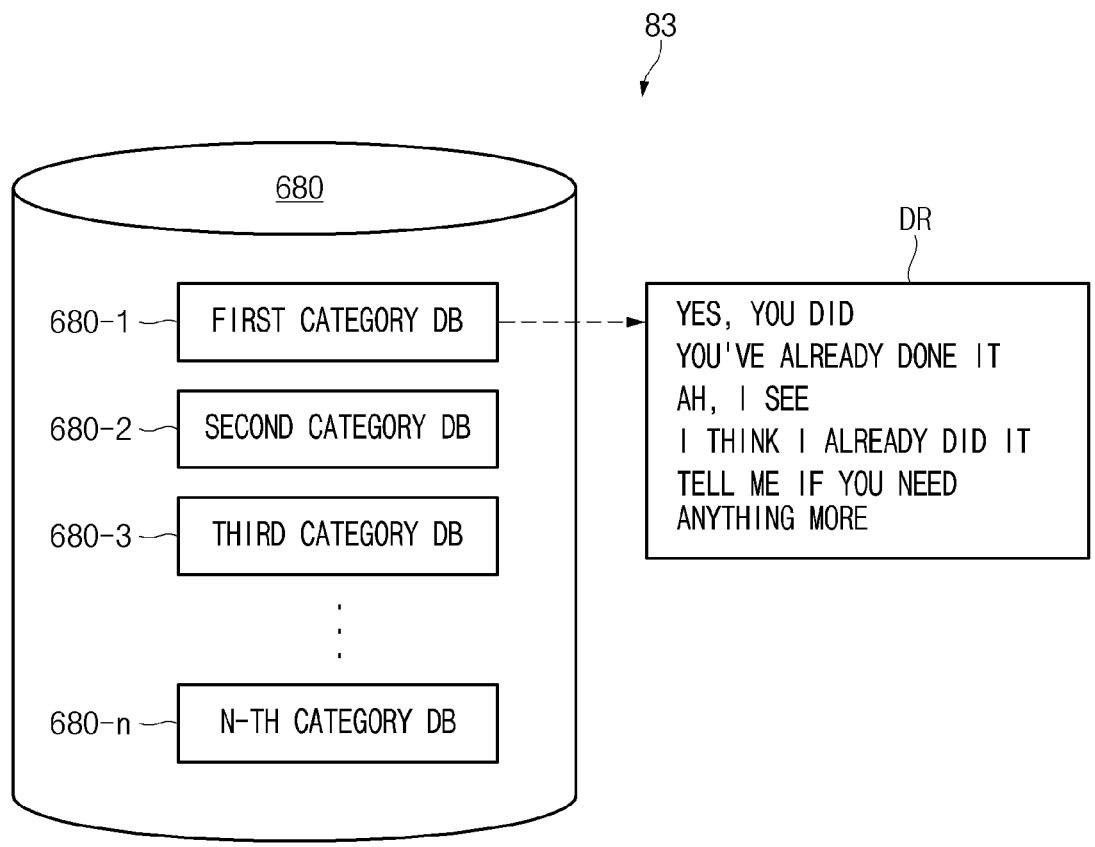
FIG. 8C illustrates a view for describing an auxiliary database and response data, according to an embodiment disclosed in the specification.

FIG. 7 illustrates a flowchart 70 for describing an operation method in which an electronic device processes a user input, according to an embodiment disclosed in the specification. FIG. 8A illustrates a view 81 for describing a user input and response data, according to an embodiment disclosed in the specification. FIG. 8B illustrates a view 82 for describing a user input and a category, according to an embodiment disclosed in the specification. FIG. 8C illustrates a view 83 for describing an auxiliary database and response data, according to an embodiment disclosed in the specification. For clarity of descriptions, contents the same as the above-described details are briefly described or omitted.

Hereinafter, it is assumed that one of the first electronic device 500 or the second electronic device 600 of FIG. 5 performs the process of FIG. 7. The operation described as being performed by one of the first electronic device 500 or the second electronic device 600 may be implemented with instructions capable of being performed (or executed) by a processor (e.g., one of the processor 520 or the processor 601). For example, the instructions capable of being performed (or executed) by a processor may be stored in a computer-readable recording medium or a memory (e.g., one of the memory 530 or the memory 603).

Referring to FIG. 7, in operation 2001, the electronic device may receive a user input. For example, the user input may be a user's voice input. In an embodiment, the electronic device may receive a user input from an external electronic device.

In operation 2003, the electronic device may determine a domain supporting a chatting mode and may process the determined domain-based response. The electronic device may grasp a user's intent from the user input. The electronic device may determine the domain based on the user input and may grasp that the user desires to process a domain or application (chat bot)-based response supporting the chatting mode using an utterance.

Referring to FIG. 8A, the user may enter voice data saying that "what am I doing tomorrow?" as a first input U1. The electronic device may grasp the user's intent by performing grammatical analysis or semantic analysis on the first input U1. In the exemplification that the first input U1 is "what am I doing tomorrow?", the electronic device may grasp the intent that the user desires to talk to the electronic device. For example, the electronic device may grasp the user's intent by identifying that the intent for performing a specific task (e.g., sending a message, making a call, or executing a specific application) is not included in the first input U1. For example, in the exemplification that the first input U1 is "what am I doing tomorrow?", the electronic device may identify that the first input U1 is a purposeless utterance.

Referring to FIG. 7, in operation 2005, the electronic device may extract the first information from the user input. For example, the first information may be information for performing matching with pieces of input data included in a main database (e.g., the main database 670 of FIG. 5).

In the first input U1 of FIG. 8A, the electronic device may extract a word included in the first input U1, the part of speech corresponding to the word, the user's intent, and a parameter (or slot) necessary to represent the user's intent, as the first information.

Returning to FIG. 7, in operation 2007, the electronic device may identify the input data of the main database matched with the first information. For example, the main database may include an input data set and a response data set corresponding to the input data. The electronic device may access the main database and may match the first information with each of the pieces of input data included in the input data set. The input data set may include an example list of the user inputs that are expected to be entered by the user. The response data set may include pieces of response data respectively corresponding to the pieces of input data included in the input data set.

In operation 2009, the electronic device may output response data corresponding to the user input in the main database based on the event that the input data of the main database matched with the first information is identified.

In an embodiment, when the response data is in a text form, the electronic device may convert the response data into voice data to transmit the voice data to an external electronic device. For example, the external electronic device may output the response data that is voice data.

Returning to FIG. 8A, the first information about the first input U1 may be matched with the input data included in, for example, the input data set of the main database. The electronic device may output the first response data A1 corresponding to the matched input data, from the main database. For example, the response data corresponding to the matched input data may be a response data set including pieces of response data. The first response data A1 may be one of the pieces of response data.

For example, the electronic device may output the first response data A1 saying that "make a bucket list you want at this chance" with respect to the first input U1. The first response data A1 that is in the text form may be converted into voice data and then the voice data may be provided to the user in a voice form.

Referring to FIG. 7, in operation 2011, the electronic device may identify the category of the user input, based on the event that the input data of the main database matched with the first information is not identified. For example, the electronic device may extract the second information from a user input to identify the category of the user input. For example, the second information may be information for performing matching with category DBs included in the auxiliary database (e.g., the auxiliary database 680 of FIG. 5).

Returning to FIGS. 7 and 8A together, the electronic device may receive a second input U2 saying that "already done" from the user. The electronic device may identify that the intent for performing a specific task is not included in the second input U2. In operation 2003, the electronic device may identify the user still desires to execute a capsule or domain supporting a chatting mode, by grasping the user intent for the second input. In operation 2005, the electronic device may extract the first information from the second input U2. In operation 2007, the electronic device may identify the input data of the main database matched with the first information about the second input U2. In the exemplification that the second input U2 is "already done", the input data of the main database matched with the first information about the second input U2 may not be identified. In operation 2011, the electronic device may identify the category of the second input U2.

Referring to FIG. 8B, the electronic device may extract second information based on the string or word of the second input U2 of "already done". The electronic device may access the auxiliary database to match the second information with the input data set of the auxiliary database. For example, the electronic device may match the second information with the pieces of input data included in each of the first input data set DS1 and the second input data set DS2. The electronic device may identify that the second input is matched with the first input data set DS1, based on the second information. The electronic device may identify the second input U2 as a first category (e.g., completion).

Returning to FIG. 7, in operation 2013, the electronic device may determine whether an auxiliary database corresponding to the category is identified.

In operation 2015, the electronic device may output response data from the auxiliary database, based on the event that the auxiliary database is identified.

Referring to FIG. 8C, for example, the auxiliary database may include 'n' category DBs 680-1, 680-2, 680-3, . . . , and 680-n ('n' is a natural number). Each category DB may include response data set including pieces of response data. For example, the first category DB 680-1 may include a response data set DR.

The electronic device may identify the first category DB 680-1 of the auxiliary database 680, based on the event that the second input U2 is identified as the first category. The first category DB 680-1 may include a response data set DR. The electronic device may output second response data A2 of FIG. 8A, which is one of response data sets DR of the first category DB 680-1. In the exemplification that the second input U2 is "already done", the electronic device may identify the first category DB 680-1 that is a complete category and may output second response data A2 saying that "please tell me if you need anything more" in the response data set DR of the first category DB 680-1.

An electronic device according to embodiments disclosed in the specification may provide a user with an accurate response by outputting response data matched with a user input from the auxiliary database in response to the user input not capable of identifying response data in the main database.

Returning to FIG. 7, in operation 2017, the electronic device may output third response databased on the event that the auxiliary database corresponding to the category is not identified. For example, when the user input is not matched with pieces of data included in the main database and the auxiliary database, the electronic device may output the third response data. For example, the third response data may be data included in a database separate from the main database and the auxiliary database.

Hereinafter, a method in which an electronic device according to an embodiment disclosed in the specification processes a user input will be described with reference to FIGS. 8B, 9A, 9B, and 9C.

Figure 9B:
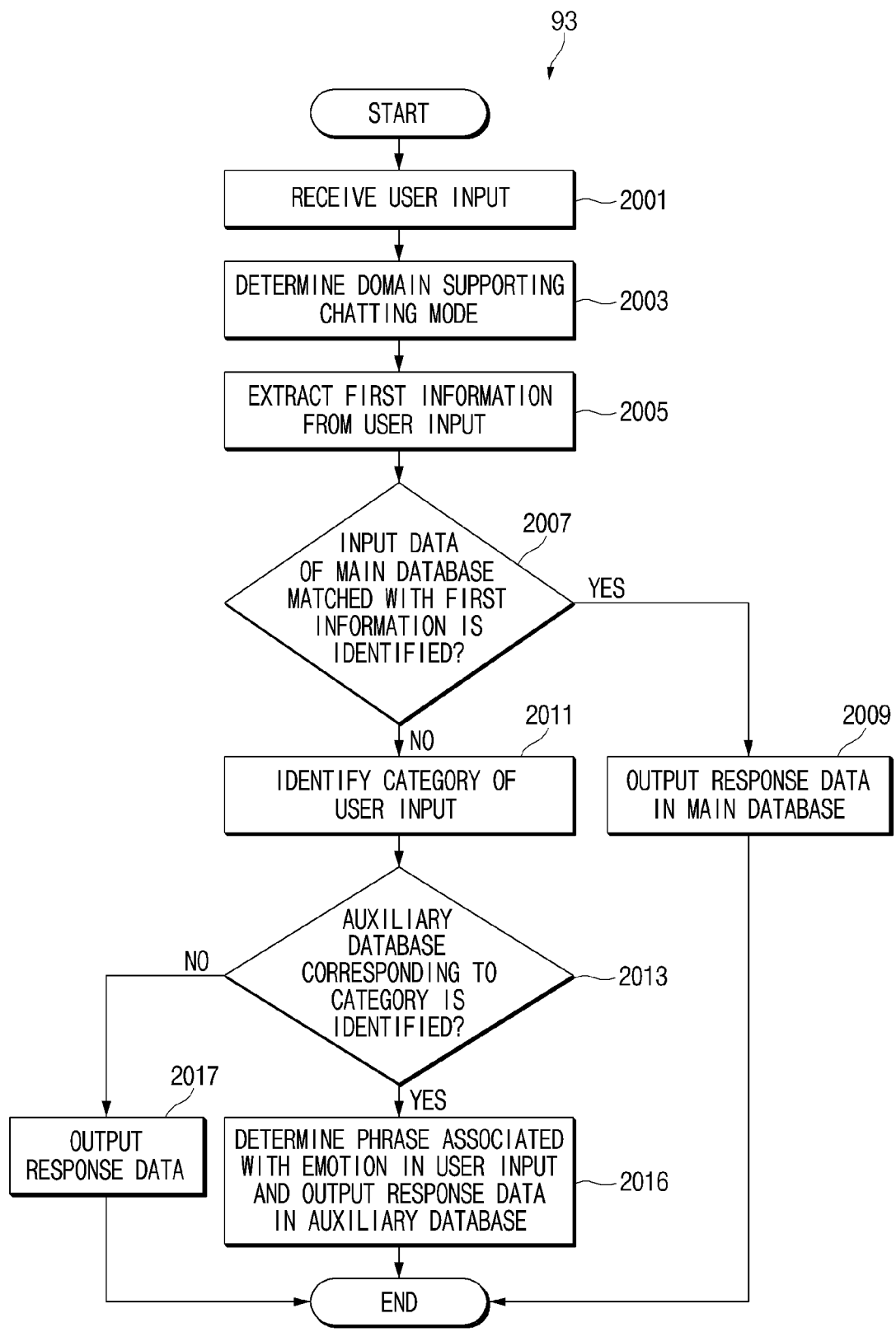
FIG. 9B illustrates a flowchart for describing a method in which an electronic device processes a user input, according to an embodiment disclosed in the specification.
Figure 9C:
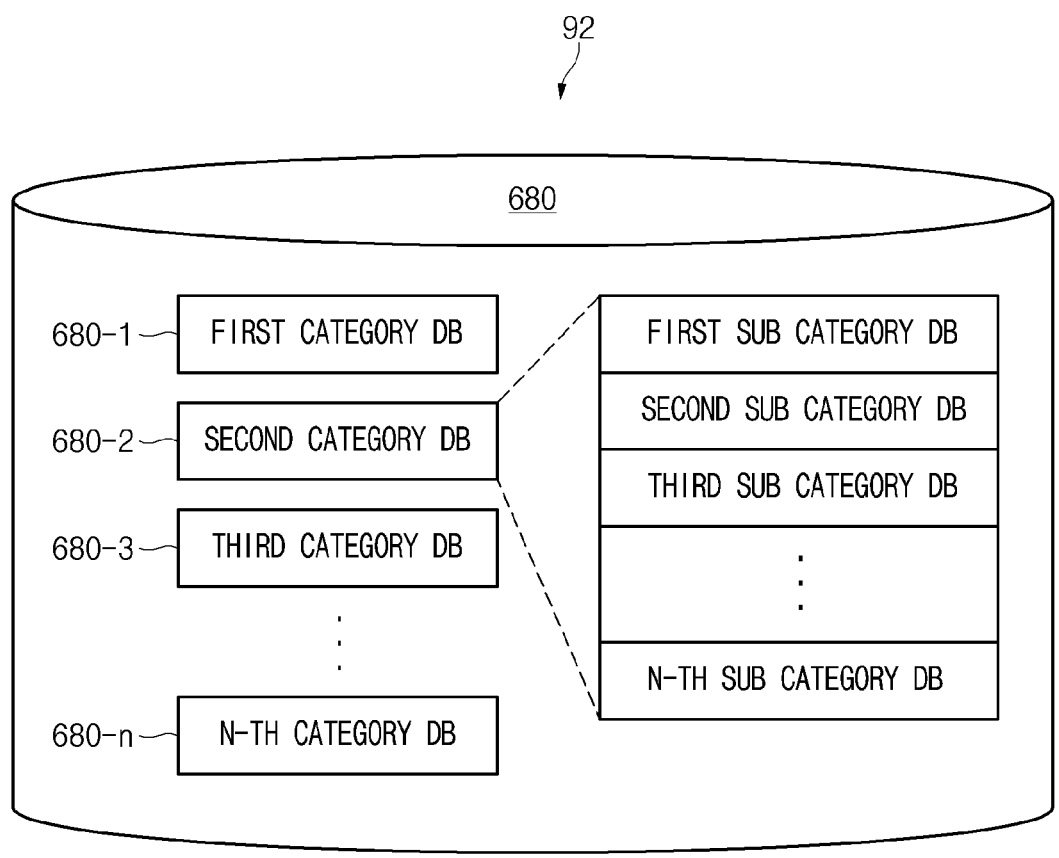
FIG. 9C illustrates a view for describing an auxiliary database and response data, according to an embodiment disclosed in the specification.

FIG. 9A illustrates a view 91 for describing a user input and response data, according to an embodiment disclosed in the specification. FIG. 9B illustrates a flowchart 93 for describing a method in which an electronic device processes a user input, according to an embodiment disclosed in the specification. FIG. 9C illustrates a view 92 for describing an auxiliary database and response data, according to an embodiment disclosed in the specification. For clarity of descriptions, contents the same as the above-described details are briefly described or omitted. Operation 2001, operation 2003, operation 2005, operation 2007, operation 2009, operation 2011, operation 2013, and operation 2017 of FIG. 9B may correspond to operation 2001, operation 2003, operation 2005, operation 2007, operation 2009, operation 2011, operation 2013, and operation 2017 of FIG. 7.

Referring to FIGS. 9A and 9B, the electronic device may perform operation 2001, operation 2003, operation 2005, and operation 2007 in response to the event that "I dislike mom", which is the third input U3, is entered as a user input. In operation 2007, the electronic device may determine that the input data of the main database matched with the first information for the third input U3 is not identified. In an embodiment, the main database may not include a response data set for each of a word associated with a family and/or a word associated with negative (or positive) emotions.

In operation 2011, the electronic device may identify the category of the third input U3.

Referring to FIG. 8B, the electronic device may extract second information based on the string or word of the third input U3 of "I dislike mom". For example, the electronic device may identify that the third input U3 is matched with the second input data set DS2, based on the second information. The electronic device may identify the third input U3 as a second category (e.g., family).

Returning to FIG. 9B, in operation 2013, the electronic device may determine whether an auxiliary database corresponding to the category is identified.

In operation 2016, the electronic device may determine a phrase associated with the emotion in the user input and may output the response data in the auxiliary database, based on the event that the auxiliary database is identified.

Referring to FIG. 9C, one of 'n' category DBs 680-1, 680-2, 680-3, . . . , and 680-n of the auxiliary database ('n' is a natural number) may include 'm' sub category DBs ('m' is a natural number).

In an embodiment, when the user input includes the phrase associated with emotions, such as the third input U3 (e.g., "dislike" associated with negative emotions is included in "I dislike mom"), the electronic device may access first to 'm' sub category DBs included in the second category DB 680-2.

In an embodiment, when the sentence in which there is no direct emotional expression but an emotion is capable of being detected is included, the electronic device may access the first to 'm' sub category DBs included in the second category DB 680-2. For example, the sentence in which there is no direct emotional expression but an emotion is capable of being detected may be implemented with a technology such as machine learning.

For example, a sub category DB may include a category of "positive", "negative", or "unknown".

For example, the electronic device may identify that a phrase (e.g., mom) capable of being classified as a specific category and a phrase (e.g., dislike) associated with the emotion are included in the third input U3 or that the sentence capable of detecting emotions is included in the third input U3. The electronic device may identify the second category DB corresponding to the third input U3 and may identify a sub category DB of the second category corresponding to the phrase associated with the emotion. For example, the electronic device may output the third response data A3 from one of sub category DBs (e.g., the first sub category DB) of the second category DB.

An electronic device according to embodiments disclosed in the specification may provide a user with an accurate response by identifying the upper category and sub category from the auxiliary database to output response data matched with a user input from the sub category database in response to a user response including the phrase associated with an emotion not capable of outputting response data from the main database.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1 st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor(e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, an electronic device may provide response data matched with a user response from the auxiliary database in response to a user response not capable of outputting response data from the main database.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
  a user interface;
  a memory configured to store a main database including a plurality of input data and an auxiliary database including a plurality of categories, wherein each of the plurality of input data includes at least one first response data and wherein each of the plurality of categories includes at least one second response data; and
  a processor operably coupled to the user interface and the memory, wherein the processor is configured to:

receive a user input, using the user interface;
extract first information from the user input; and
in response to identifying that input data matching the first information is identified among the plurality of input data, provide first response data corresponding to the input data matched the first information as a processing result for the user input,
wherein the processor is further configured to, in response to identifying that the input data matching the first information is not identified among the plurality of input data:
identify an emotion for a user based on at least a portion of the user input;
identify a category corresponding to the identified emotion among the plurality of categories included in the auxiliary database;
identify second response data corresponding to the identified category; and
provide the second response data as the processing result for the user input.

2. The electronic device of claim 1, wherein the processor is further configured to:
determine a capsule or domain supporting a chatting mode using an utterance of a user, based in part on the user input.

3. The electronic device of claim 1, further comprising:
a communication module configured to perform communication with an external electronic device,
wherein the processor is configured to convert the processing result, that is in a text form, into voice data to provide the external electronic device with the voice data, using the communication module.

4. The electronic device of claim 1, wherein the processor is further configured to:
identify a specific phrase from the user input;
identify a sub category of the identified category based on the specific phrase; and
identify the second response data from the sub category.

5. The electronic device of claim 1, wherein the processor is further configured to:
provide third response data in response to not identifying the category corresponding to the identified emotion, and
wherein the third response data is included in a database separate from the main database and the auxiliary database.

6. The electronic device of claim 1, wherein the processor is further configured to:
extract the first information from the user input based on natural language processing.

7. The electronic device of claim 1, further comprising:
a speaker,
wherein the processor is further configured to convert the processing result, that is in a text form, into voice data to provide the voice data through the speaker.

8. A method for processing a user input of an electronic device comprising a main database including a plurality of input data and an auxiliary database including a plurality of categories, wherein each of the plurality of input data includes at least one first response data and wherein each of the plurality of categories includes at least one second response data, the method comprising:
receiving the user input, using a user interface;
extracting first information from the user input;
in response to identifying that input data matching the first information is identified among the plurality of input data, providing first response data corresponding to the input data matched the first information as a processing result for the user input; and
in response to identifying that the input data matching the first information is not identified among the plurality of input data,
identifying an emotion for a user based on at least a portion of the user input;
identifying a category corresponding to the identified emotion among the plurality of categories included in the auxiliary database;
identifying second response data corresponding to the identified category; and
providing the second response data as the processing result for the user input.

9. The method of claim 8, further comprising:
determining a capsule or domain supporting a chatting mode using an utterance of a user, based in part on the user input.

10. The method of claim 8, further comprising:
providing third response data in response to not identifying the category corresponding to the identified emotion,
wherein the third response data is included in a database separate from the main database and the auxiliary database.

11. The method of claim 8, further comprising:
converting the processing result, that is in a text form, into voice data to provide an external electronic device with the voice data, using a communication module.

12. The method of claim 8, further comprising:
identifying a specific phrase from the user input;
identifying a sub category of the identified category based on the specific phrase; and
identifying the second response data from the sub category.

13. The method of claim 8, wherein the extracting of the first information from the user input includes:
extracting the first information from the user input based on natural language processing.

14. A system comprising:
a first electronic device including a communication module and a user interface; and
a second electronic device configured to communicate with the first electronic device through the communication module and including a processor and a memory,
wherein the memory is configured to store a main database including a plurality of input data and an auxiliary database including a plurality of categories, wherein each of the plurality of input data includes at least one first response data and wherein each of the plurality of categories includes at least one second response data,
wherein the processor is operably coupled to the memory and configured to:
receive a user input entered to the first electronic device using the user interface, from the first electronic device;
extract first information from the user input;
in response to identifying that input data matching the first information is identified among the plurality of input data, transmit, to the first electronic device, first response data corresponding to the input data matched the first information as a processing result for the user input;
wherein the processor is further configured to, in response to identifying that the input data matching the first information is not identified among the plurality of input data:

identify an emotion for a user based on at least a portion of the user input;
identify a category corresponding to an identified emotion among the plurality of categories included in the auxiliary database;
identify second response data corresponding to the identified category; and
transmit the second response data as the processing result for the user input to the first electronic device.

15. The system of claim 14, wherein the processor is further configured to:
cause a capsule or domain supporting a chatting mode using an utterance of a user to be executed in the first electronic device, based in part on the user input.

16. The system of claim 14, wherein the processor is further configured to:
change the processing result into voice data and transmit the voice data to the first electronic device.

17. The system of claim 14, wherein the processor is further configured to:
identify a specific phrase from the user input;
identify a sub category of the identified category based on the specific phrase; and
identify the second response data from the sub category.

18. The system of claim 17, wherein the processor is further configured to:
providing third response data in response to not identifying the category corresponding to the identified emotion, and
wherein the third response data is included in a database separate from the main database and the auxiliary database.

* * * * *